(12) United States Patent
Fitzpatrick et al.

(10) Patent No.: US 7,788,168 B2
(45) Date of Patent: *Aug. 31, 2010

(54) METHOD, SYSTEM, AND APPARATUS FOR DYNAMICALLY CREATING ELECTRONIC CONTRACTS

(75) Inventors: Gregory P. Fitzpatrick, Keller, TX (US); Tsz Cheng, Arlington, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/171,785

(22) Filed: Jul. 11, 2008

(65) Prior Publication Data

US 2008/0270281 A1 Oct. 30, 2008

Related U.S. Application Data

(63) Continuation of application No. 10/109,393, filed on Mar. 28, 2002, now Pat. No. 7,418,421.

(51) Int. Cl.
G06Q 40/00 (2006.01)
G06Q 99/00 (2006.01)
H04K 1/00 (2006.01)
H04L 9/00 (2006.01)

(52) U.S. Cl. ............................. 705/37; 705/26; 705/35; 705/36; 705/67

(58) Field of Classification Search ................. 705/14, 705/26, 35, 37, 67
See application file for complete search history.

(56) References Cited

U.S. PATENT DOCUMENTS 5,862,223 A 1/1999 Walker et al.
5,915,019 A 6/1999 Ginter et al.
5,917,912 A 6/1999 Ginter et al.
5,948,040 A 9/1999 DeLorme et al.
5,982,891 A 11/1999 Ginter et al.
6,131,087 A * 10/2000 Luke et al. ................... 705/26
6,185,683 B1 2/2001 Ginter et al.
6,338,050 B1 * 1/2002 Conklin et al. ............... 705/80
7,146,331 B1 * 12/2006 Young ......................... 705/26
7,418,421 B2 * 8/2008 Fitzpatrick et al. ............ 705/37
2001/0037284 A1 11/2001 Finkelstein et al.
2001/0056395 A1 * 12/2001 Khan ........................... 705/37
2002/0099643 A1 * 7/2002 Abeshouse et al. ........... 705/37
2003/0069986 A1 * 4/2003 Petrone et al. ............... 709/232
2003/0074298 A1 4/2003 Daum
2003/0074301 A1 4/2003 Solomon
2003/0078850 A1 * 4/2003 Hartman et al. .............. 705/26
2007/0067231 A1 3/2007 de Chabris et al.

FOREIGN PATENT DOCUMENTS

WO WO 00/19663 4/2000

* cited by examiner

*Primary Examiner*—Charles C Agwumezie
(74) *Attorney, Agent, or Firm*—Novak Druce + Quigg

(57) ABSTRACT

A method of dynamically negotiating a transaction can include determining a potential transaction between participants according to transaction parameters stored within a transaction parameter data store. The transaction parameters can be associated with each of the participants and can specify acceptable transaction terms. The potential transactions can be evaluated according to a mutual benefit conferred on the participants by the potential transactions according to the transaction parameters. The potential transactions can be ordered according to decreasing mutual benefit; and, the potential transaction having the greatest mutual benefit can be presented to the participants.

10 Claims, 2 Drawing Sheets

METHOD, SYSTEM, AND APPARATUS FOR DYNAMICALLY CREATING ELECTRONIC CONTRACTS

CROSS REFERENCE TO RELATED APPLICATIONS

This application is a continuation of, and accordingly claims the benefit from, U.S. patent application Ser. No. 10/109,393, now issued U.S. Pat. No. 7,418,421, which was filed with the U.S. Patent and Trademark Office on Mar. 28, 2002.

BACKGROUND OF THE INVENTION

1. Technical Field

The invention relates to the field of electronic commerce, and more particularly, to developing electronic commerce contracts and transactions between multiple participants.

2. Description of the Related Art

Persons and business entities engaged in electronic commerce (e-commerce), often need to create arrangements for transacting business with one another. For example, business arrangements relating to one or more transactions must be negotiated in cases where previously no relationship existed between the transaction participants. In other cases, despite the existence of a business relationship between the transaction participants, terms must be negotiated for each new transaction. Because business climates are subject to rapid and unexpected change, it is desirable to create business arrangements quickly so that transactions can be executed efficiently.

Presently, some online services facilitate transactions by allowing buyers to place electronic bids for commodities. Such online services pre-negotiate the cost of commodities with suppliers and then resell the commodities by accepting bids from buyers. The profits of the online service directly result from the difference between the pre-negotiated supplier price and the price paid by the buyer to purchase the commodity. Thus, bids exceeding the pre-negotiated price are likely to be accepted.

In consequence, although buyers can obtain commodities at advantageous prices, buyers may find themselves at a disadvantage when bidding on commodities. One disadvantage is that the online service is not a neutral third party. Rather, the buyer deals directly with an interested party whose interests are better served when buyers pay the highest price possible.

Another disadvantage of online bidding services stems from the fact that the online service pre-negotiates commodity prices with its supplier. Any negotiation perceived on the part of the buyer is illusory in that the supplier does not change its prices during the bidding process and no robust brokering and/or negotiating takes place between the buyer and the bidding service or the supplier. In consequence, the buyer may pay significantly more than necessary to obtain the desired commodity. Moreover, without any robust negotiation between the transaction participants, the achievement of a mutually beneficial transaction is unlikely.

SUMMARY OF THE INVENTION

The invention disclosed herein provides for the robust negotiation of electronic commerce (e-commerce) transactions between multiple transaction participants. The present invention can serve as a neutral third party, for example a "trusted" third party, to facilitate the negotiation of e-commerce transactions. In particular, the present invention can determine several different potential transactions in accordance with specified criteria and sequentially present the potential transactions to the transaction participants for approval.

Accordingly, one aspect of the present invention can include a method of dynamically negotiating a transaction. The method can include determining potential transactions between participants according to transaction parameters stored within at least one transaction parameter data store. For example, a trusted third party can determine the potential transactions. The transaction parameters can be associated with each of the participants and specify acceptable transaction terms. For instance, the transaction parameters can specify terms including, but not limited to, price, anonymity, shipping, taxation, financing, and customer satisfaction. The potential transactions can be evaluated according to a mutual benefit conferred on the participants by each of the potential transactions according to the transaction parameters. The potential transactions further can be ordered according to decreasing mutual benefit relating to the participants. One of the potential transactions having a greatest mutual benefit can be presented to the participants.

In one embodiment, the method can include sequentially presenting each of the potential transactions to the participants according to decreasing mutual benefit until a single potential transaction is accepted by each of the participants, or until each potential transaction is rejected by at least one of the participants. Also, one of the participants can be notified that a more favorable potential transaction can be determined if the participant modifies at least one associated transaction parameter.

The method further can include receiving the transaction parameters from at least one of the participants, generating the transaction parameters for at least one of the participants according to information provided by the participant, and determining transaction parameters for at least one of the participants from purchase history information associated with the participant. Notably, in cases where the transaction parameters are generated, an importance measure can be assigned to the generated transaction parameters.

Another aspect of the present invention can include a transaction processing system configured to determine potential transactions between participants according to transaction parameters associated with each of the participants. The transaction parameters can specify acceptable transaction terms. For example, the transaction parameters can specify transaction terms such as price, anonymity, shipping, taxation, financing, and customer satisfaction. The transaction processing system further can include a data store having the transaction parameters stored therein.

The transaction processing system also can be configured to evaluate the potential transactions according to a mutual benefit conferred on the participants, to order the potential transactions according to decreasing mutual benefit relating to the participants, and to present to the participants one of the potential transactions having a greatest mutual benefit. Notably, the system further can sequentially present each of the potential transactions to the participants according to decreasing mutual benefit until a single potential transaction is accepted by each participant, or until each potential transaction is rejected by at least one of the participants.

BRIEF DESCRIPTION OF THE DRAWINGS

There are shown in the drawings embodiments which are presently preferred, it being understood, however, that the invention is not limited to the precise arrangements and instrumentalities shown.

DETAILED DESCRIPTION OF THE INVENTION

The invention disclosed herein provides for the negotiation of electronic commerce (e-commerce) transactions between multiple transaction participants. In particular, the present invention provides a method, system, and apparatus which can serve as a neutral third party, for example a "trusted" third party, to facilitate the negotiation of e-commerce transactions. The term transaction, as used herein, can include large scale agreements having one or more transactions as well as a one time transaction relating to a single good or service. Notably, in single transaction cases, negotiations can encompass a higher degree of detail. Accordingly, the present invention can mediate a "give-to-get" approach whereby participants of an e-commerce transaction can attain mutually-acceptable business or transaction terms.

For example, when one participant initiates an e-commerce transaction, whether through a browser, a personal digital assistant, some other human interface, or via program-to-program communications, either the initiating participant or the receiving participant can invoke the present invention to mediate the e-commerce transaction. The invocation can include passing a number of parameters which describe the various terms of the transaction to the invention. Depending upon the implementation of the present invention, one or more of the transaction participants can be contacted to facilitate the completion of the transaction.

Figure 1:
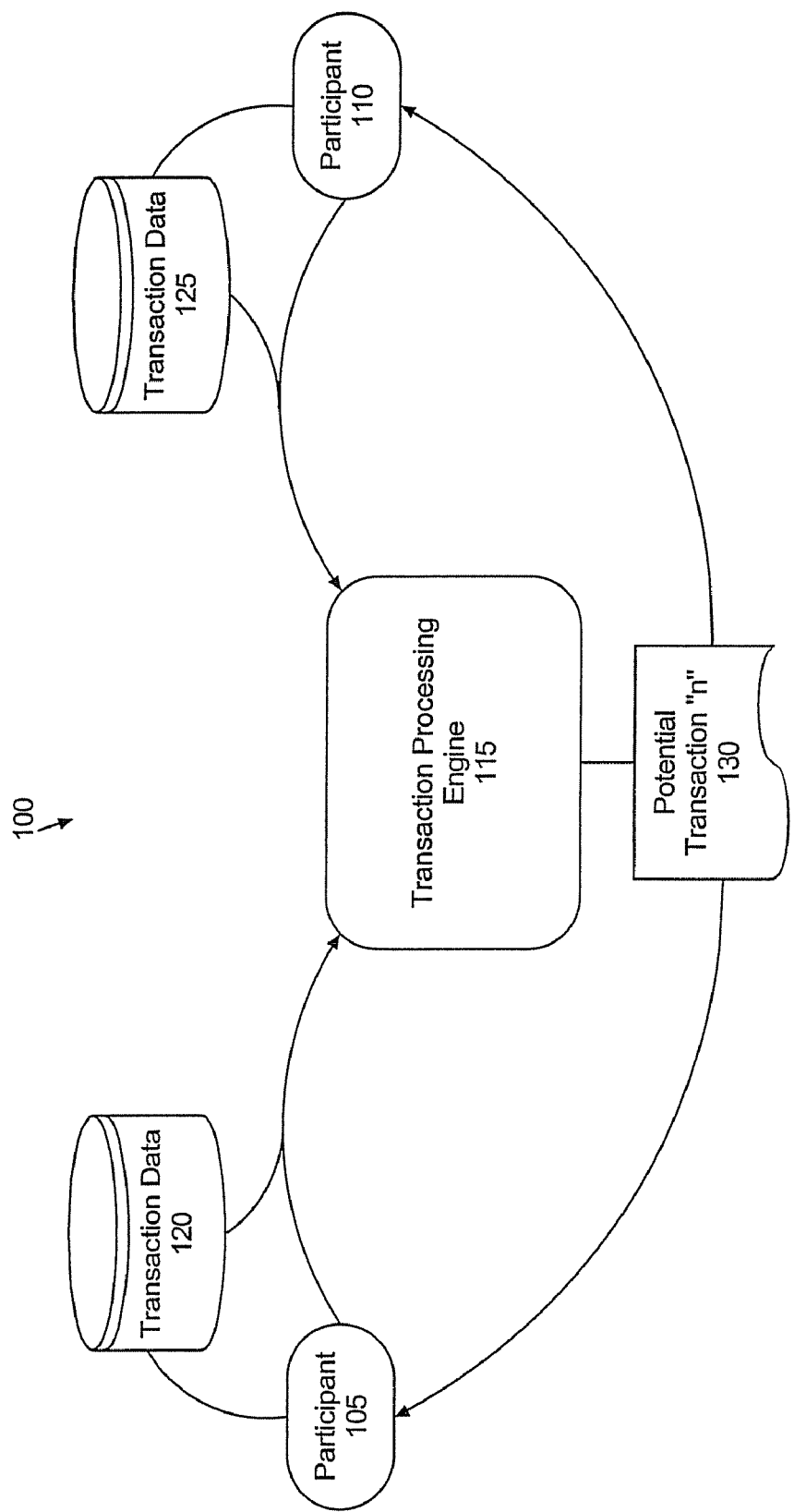
FIG. 1 is a schematic diagram illustrating an electronic commerce transaction negotiation system in accordance with the inventive arrangements disclosed herein.

FIG. 1 is a schematic diagram illustrating an e-commerce transaction negotiation system 100 in accordance with the inventive arrangements disclosed herein. As shown in FIG. 1, the system 100 can include a transaction processing engine (TPE) 115 and one or more data stores 120 and 125, each having transaction data stored therein. The TPE 115 can process transaction data from data stores 120 and 125, which correspond to participants 105 and 110 respectively, to determine one or more potential or alternate transactions 130. Each of the potential transactions can specify varying business terms.

The TPE 115 can function as a trusted third party to enable e-commerce transaction participants to negotiate terms of a transaction. The negotiations can take place in realtime or can be performed in an offline fashion. In any case, the TPE 115 can mediate between one or more e-commerce transaction participants, for example buyers and sellers, to assure that each transaction participant obtains a set of transaction terms which are perceived to be mutually beneficial and fair.

The TPE 115 can process transaction parameters associated with each participant involved in a particular e-commerce transaction to determine one or more different transaction scenarios, or potential transactions, which may be acceptable to the participants. The transaction parameters, which will be discussed in greater detail with reference to the transaction data stores 120 and 125, can specify each participant's preferred transaction terms relating to a given e-commerce transaction. For example, the transaction parameters can specify preferred ranges for transaction terms such as price, shipping dates, shipping costs, as well as other relevant terms of the transaction.

The TPE 115 can identify 'n' potential transactions wherein each of the transaction participants is likely to accept the transaction terms. The potential transactions can be generated according to the transaction parameters associated with each participant. Notably, the TPE 115 can rank these potential transactions in order of decreasing mutual benefit. The top ranking potential transaction can be presented first to each participant simultaneously. In the event that one or more of the participants declines the potential transaction, the TPE 115 can contact each of the participants and present the next most mutually beneficial potential transaction until an agreement is reached or no further potential transactions remain.

For example, within each participant's set of associated transaction parameters, particular parameters can be identified as more or less important with respect to the other transaction parameters. Notably, the importance determination or weighting can be performed by the participants, or in particular cases, by the TPE 115. Thus, for example, delivery time can be weighted higher than price. The weights also can be assigned to a specified parameter range on a sliding scale. For instance, a buyer can assign a greater weight to a purchase price at the lower portion of a range of acceptable prices while assigning less weight or importance to a price in the upper portion of the range. The potential transactions can be ordered from the most mutually beneficial to the least by evaluating what each participant receives in the potential transactions, what each participant gives up in the potential transactions, and the relative importance of each of the terms determined for the potential transactions in accordance with the specified transaction parameters for each participant.

Notably, the potential transactions can be evaluated or scored such that a contract heavily weighted in favor of one participant will not be rated as highly as another contract which is mutually beneficial to each participant. In illustration, if the degree of mutual benefit is determined by scoring the benefit to each participant and then summing the two scores, transactions with a larger total score but having a larger differential between the scores for each participant can be excluded from consideration or ranked lower. Thus, if one transaction has a score of 8 resulting from participant scores of 4 and 4, and another transaction has a score of 10 resulting from participant scores of 1 and 9, the transaction having a score of 8 can be said to be more mutually beneficial than the transaction having a score of 10 despite the lower overall total score. The participant score differential, in effect, can lead to the determination that the transaction is not mutually beneficial.

It should be appreciated, however, that the transaction attributes can be specified in any of a number of different formats and need not be weighted or specified as ranges. For example, a participant can specify several different alternative transaction parameters for a given term and specify which is the first choice, the second choice, and so on. Still, the aforementioned examples are provided for purposes of illustration only and are not intended as a limitation on the present invention.

The transaction data stores 120 and 125, which can store the transaction parameters, can be implemented in any of a variety of ways. In one embodiment, the data stores can be located on premises with each respective participant 105 and 110. In another embodiment, the transaction data stores 120 and 125 can be remotely located in another third party computer system accessible via a computer communications link. Still, in another embodiment, the transaction data stores 120 and 125 can be included within the TPE 115. Notably, in cases where the data stores 120 and 125 are not located on premises with the participants, the data stores can be implemented as a single larger data store or as several distributed data stores.

In any case, the transaction parameters stored within the data stores 120 and 125 can specify a participant's preferences for engaging in one or more transactions. The transaction parameters can specify terms relating to pricing, shipping, taxation, financing, customer satisfaction, and a participant's degree of anonymity within the transaction. For example, pricing parameters can include minimum base price, maximum price, and volume discounts. Shipping parameters can include the application or waiver of shipping charges, preferred shipping methods, shipping notifications, tracking of the shipment, and the risk of loss during shipment. Taxation parameters, for example, can be applied once the geographic location of the participants is established. Financing parameters can specify financial institutions which may have pre-approved favorable credit terms. Financing parameters further can specify whether the purchase price can be financed, is due upon delivery, is due before delivery, the interest rate, and other credit terms. Customer satisfaction parameters can include warranty terms of the product or service, whether free access to a 24-hour toll-free service line is included, any guarantee terms, and whether easy return services such as authorized return service from a carrier are included in the transaction.

Notably, more general parameters not directly related to the transaction, for example transactional anonymity, can affect one or more other transaction parameters. In illustration, if a participant chooses to be completely anonymous and withhold all identifying information during a transaction, neither the TPE 115 nor the other participant would be able to run a credit check on the anonymous party. In consequence, the selling participant may offer less attractive financing or offer no credit whatsoever to the anonymous party. In contrast, if the anonymous party chooses to provide identifying information such that a credit check can be performed, the selling party may offer more favorable financing pending the results of the credit check. Moreover, with identifying information, the selling participant can identify the buying participant as a preferred customer and provide further advantageous transaction terms typically reserved for preferred customers such as reduced pricing or more favorable financing.

The buying participant also can choose an intermediate level of anonymity wherein the TPE 115 receives identifying information, but withholds the information from the selling participant. In that case, the TPE 115 can perform functions such as a credit check and provide limited information to the selling participant. For example, the selling participant can learn the credit rating of the buyer. The selling participant then can offer more appropriate financing. Notably, the financing offered can be more favorable than in the case where the buying participant chooses complete anonymity, but less favorable than the case where the buying participant provides identifying information to the selling participant.

The transaction parameters disclosed herein are provided as examples to better illustrate the various embodiments of the present invention and are not intended as a limitation on the invention. Accordingly, those skilled in the art will recognize that any term of a transaction which is important to a transaction party and can be quantified can be included within the present invention as a transaction parameter.

In another aspect of the invention, the TPE 115 can notify one or more of the participants that should the participant alter one or more transaction parameters, then more favorable terms would likely be offered by the other participant. Thus, taking the previous example, the TPE 115 can notify the anonymous participant that should the participant provide identifying information, at least to the TPE 115, then the selling participant may agree to more favorable transaction terms. Thus, pending the outcome of a credit check, more favorable financing can be offered thereby resulting in a more mutually beneficial transaction.

The transaction parameters stored within the data stores 120 and 125 can be determined in a number of different ways. For example, in one aspect, the participants can explicitly write the transaction parameters and store the parameters within the data store, whether the data store is located on premises with the participant, at a remote location, or within the TPE 115. In that case, the transaction parameters can be static rules, but can be edited from time to time.

In another aspect, the transaction parameters can be generated by the TPE 115 responsive to input from transaction participants. For example, the TPE 115 can pose queries to the transaction participants and determine participant transaction parameters from the participant responses.

The TPE 115 also can automatically determine transaction parameters for the participants. For example, the TPE 115 can access a purchase history for a participant and determine transaction preferences from the purchase history. The transaction preferences then can be stored within one of the data stores 120 and/or 125. The TPE 115 further can generate the transaction parameters responsive to prevailing market conditions. The market conditions, for example, can be accessed from a remote source or can be stored within the TPE 115 and updated from time to time.

Still, the TPE 115 can facilitate a dynamically negotiated contract in which both participants give-to-get. In that case, the transaction parameters from each party may come from human interaction and judgment, or from programmatic interaction. The transaction parameters, for example, can be included within a negotiation profile established by each participant which can be communicated to the TPE 115. In any event, the transaction parameters can be determined using the aforementioned techniques or various combinations thereof. For example, transaction parameters, including weights, can be determined through a combination of a participant's purchase history information and responses to queries.

Figure 2:
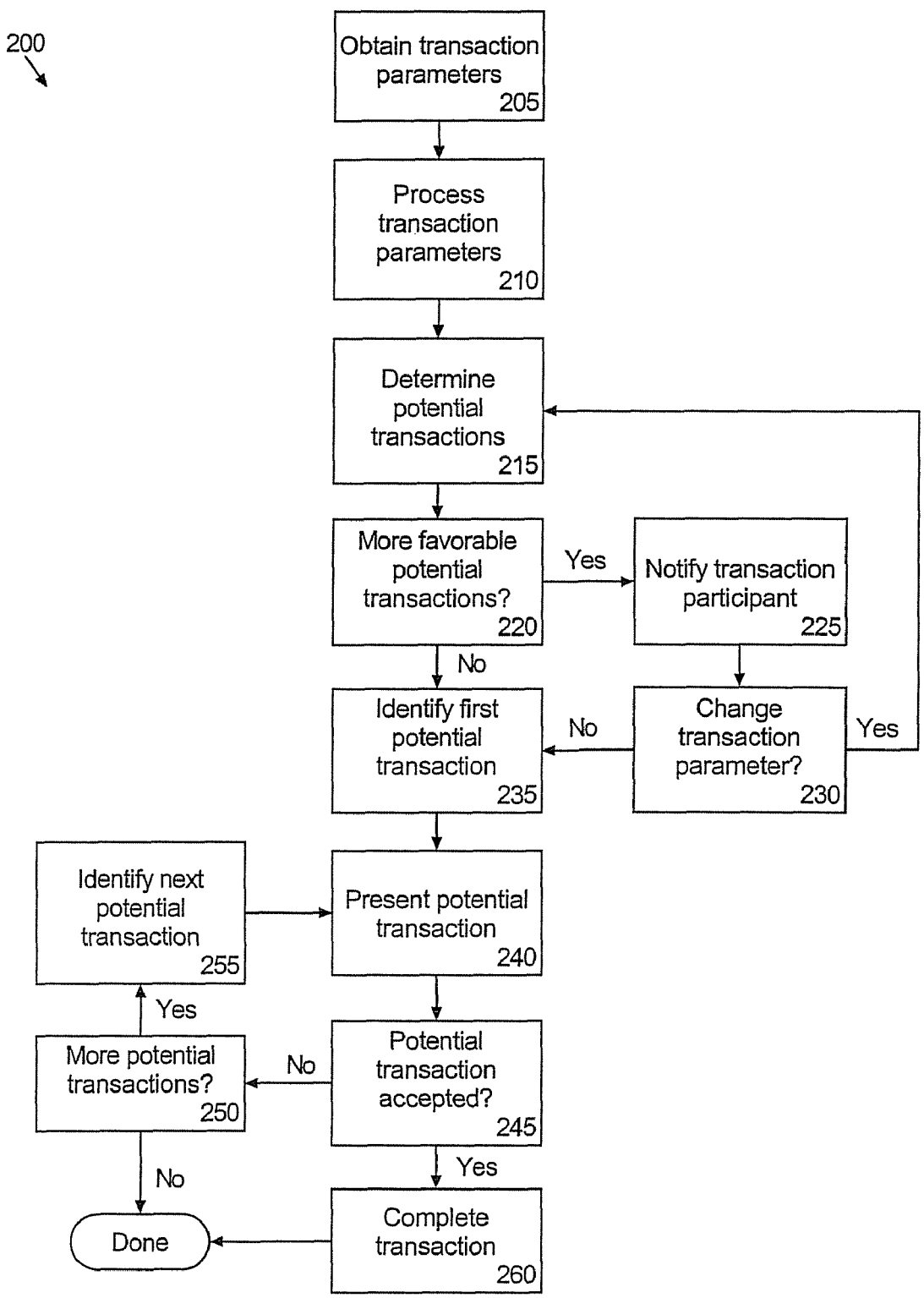
FIG. 2 is a flow chart illustrating a method of negotiating electronic commerce transactions as performed by the system of FIG. 1.

FIG. 2 is a flow chart illustrating a method 200 of negotiating electronic commerce transactions which can be performed by the system 100 of FIG. 1. The method can begin in a state wherein the transaction parameters have been identified, generated, or otherwise determined as previously described herein; and, the TPE has been invoked by one or more of the transaction participants. Accordingly, in step 205, the transaction parameters for each participant can be obtained. In step 210, the transaction parameters can be processed to identify the respective terms each participant proposes as part of the transaction. Further, the relative importance of the various transaction parameters can be determined as well as the degree to which each party is willing to compromise. For example, various transaction parameter ranges can be identified such as a price range which can be specified as a base price with increasing volume discounts.

In step 215, 'n' potential transactions can be determined according to the transaction parameters associated with each participant. The potential transactions can include varying terms in accordance with the transaction parameters. For example, one potential transaction can specify extremely favorable financing for the buyer, but include shipping terms more favorable to the seller. Accordingly, another potential transaction can specify less favorable financing for the buyer, but shift the risk of loss during shipment to the seller. Another potential transaction can specify a lower quantity of a product and require payment in advance, while another potential transaction can specify a larger quantity of product at a volume discount, as well as financing of the purchase price.

Still, the examples disclosed herein are for purposes of illustration only and are not intended as a limitation on the invention. Accordingly, those skilled in the art will recognize that the terms of the potential transactions can be modified in accordance with any of the specified transaction parameters. Moreover, the terms of a potential transaction can be modified beyond the bounds specified as acceptable by the participating parties, but within a predetermined range or tolerance of the specified transaction parameters.

In step 220, a determination can be made as to whether a more favorable potential transaction could be determined if one or more of the participants chooses to alter a particular transaction parameter. If so, the method can proceed to step 225. If not, the method can continue to step 235. In step 225, the transaction participant can be notified that a modification of a particular transaction parameter can result in a more favorable transaction. For example, a participant can be notified that expanding the specified range of an acceptable purchase quantity, deciding that a particular term such as air delivery is not necessary, or providing identifying information would likely result in a more favorable transaction term such as price, financing, or the like.

In step 230, after being notified, if the participant changes one or more transaction parameters, the method can continue to step 215 to determine 'n' potential transactions according to the revised transaction parameters. If not, the method can continue to step 235. In step 235, the first potential transaction can be identified. More specifically, the potential transaction having the highest mutual benefit for the transaction participants can be identified. Accordingly, in step 240, that potential transaction can be presented to the participants. Notably, the potential transaction can be presented to the participants simultaneously.

In step 245, a determination can be made as to whether each of the participants have accepted the terms of the potential transaction. If so, the method can continue to step 260 where the transaction can be completed and processed. For example, digital signatures can be received to execute the potential transaction, one of the participants can apply for financing, funds can be transferred, or any other actions which may be required under the terms of the agreed upon transaction can be performed. After the transaction is processed, the method can end.

If the potential transaction is not accepted by each of the participants, however, the method can proceed to step 250. In step 250, a determination can be made as to whether any other potential transactions have yet to be presented to the transaction participants. If so, the method can continue to step 255. If not, the method can end and provide a notification to each of the participants that no agreement was reached. In step 255, where additional potential transactions exist which have not been presented to the transaction participants, the next most mutually beneficial potential transaction can be identified. Accordingly, the method can continue to step 240 where the potential transaction can be presented to the transaction participants. The method can repeat through steps 240, 245, 250, and 255 until each of the potential transactions has been presented and rejected by the transaction participants, or until one of the potential transactions is accepted by each of the transaction participants.

The invention disclosed herein provides for the robust negotiation of transactions between multiple transaction participants and can lead to increased commerce among the transaction participants. The present invention further can produce a significant competitive advantage for the entity providing TPE services. For example, in cases where the TPE is a financial institution, the financial institution can provide financial services under the proposed transaction or perform credit checks.

The invention disclosed herein can reduce contract negotiation time from weeks and days to possibly minutes and seconds, facilitate the negotiation of large scale agreements, as well as the negotiation of single transactions. Additionally, the ranking and presentation of mutually beneficial potential transactions by a trusted third party can provide each participant with an agreement suited to the participant's needs. Finally, the present invention can facilitate commerce across geographic and cultural boundaries. This can be particularly beneficial when used in cultures where explicit, face-to-face, hard-nosed negotiation is often considered impolite. In such cases, the invention can provide a buffer between the participants which still allows each participant to negotiate and achieve a mutually acceptable result.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A transaction processing system for determining potential transactions between two or more potential transaction participants according to transaction parameters, the transaction processing system comprising:

at least one data store including transaction parameters associated with each of said participants; and a transaction processing engine for determining a plurality of potential transactions based upon the transaction parameters and, for each potential transaction, assigning a separate transaction score to each of said participants such that a plurality of scores, one for each of said participants, is associated with each potential transaction, ranking by the transaction processing engine each potential transaction based on a mutual benefit of each potential transaction to all transaction participants and assigning a higher rank to a particular potential transaction that has a higher mutual benefit than that for another potential transaction, wherein said mutual benefit is computed taking into consideration of a total score of all participants and a participant score differential for each potential transaction, wherein each participant score differential measures a difference between transaction scores respectively assigned to each transaction participant for a corresponding potential transaction, and wherein a smaller participant score differential means a higher mutual benefit, and sequentially presenting to each of said participants each potential transaction according to decreasing rank until all transaction participants agree to a presented potential transaction or until no potential transactions remain to be presented;

determining whether an acceptable potential transaction more favorable to the at least one rejecting transaction participant can be generated by another participant altering at least an associated transaction parameter; and notifying said another participant that an acceptable potential transaction can be generated if said participant modifies at least one associated transaction parameter.

2. The system of claim 1, wherein said transaction parameters specify transaction terms selected from the group consisting of price, anonymity, shipping, taxation, financing, and customer satisfaction.

3. A computer-readable storage medium comprising executable instructions, which, when executed by a transaction processing engine, cause the transaction processing engine to perform the steps of:

determining by a transaction processing engine a plurality of potential transactions according to transaction parameters stored within at least one transaction parameter data store, said transaction parameters being associated with two or more potential transaction participants, and, for each potential transaction, assigning to each of said participants a separate transaction score such that a plurality of scores, one for each of said participants, is associated with each potential transaction;

ranking by a transaction processing engine each potential transaction based on a mutual benefit of each potential transaction to all transaction participants and assigning a higher rank to a particular potential transaction that has a higher mutual benefit than that for another potential transaction, wherein said mutual benefit is computed taking into consideration of a total score of all participants and a participant score differential for each potential transaction, wherein each participant score differential measures a difference between transaction scores respectively assigned to each participant for a corresponding potential transaction, wherein a smaller participant score differential means a higher mutual benefit; and sequentially presenting to each of said participants each potential transaction according to decreasing rank until all transaction participants agree to a presented potential transaction or until no potential transactions remain to be presented;

determining whether an acceptable potential transaction more favorable to the at least one rejecting transaction participant can be generated by another participant altering at least an associated transaction parameter; and notifying said another participant that an acceptable potential transaction can be generated if said participant modifies at least one associated transaction parameter.

4. The computer-readable storage of claim 3, said determining step further comprising:

determining said potential transactions within a trusted third party.

5. The computer-readable storage of claim 3, said determining step comprising:

determining potential transactions according to transaction parameters specifying transaction terms selected from the group consisting of price, anonymity, shipping, taxation, financing, and customer satisfaction.

6. The computer-readable storage of claim 3, further comprising:

receiving said transaction parameters from at least one of said participants.

7. The computer-readable storage of claim 3, further comprising:

generating said transaction parameters for at least one of said participants according to information provided by said participant.

8. The computer-readable storage of claim 7, further comprising:

assigning an importance measure to said generated transaction parameters.

9. The computer-readable storage of claim 3, further comprising:

determining said transaction parameters for at least one of said participants from purchase history information associated with said participant.

10. The computer-readable storage of claim 9, further comprising:

assigning an importance measure to said generated transaction parameters.

* * * * *